Nov. 20, 1956   F. BADIN   2,771,170
CENTRIFUGAL POWDER CLUTCHES
Filed March 28, 1951
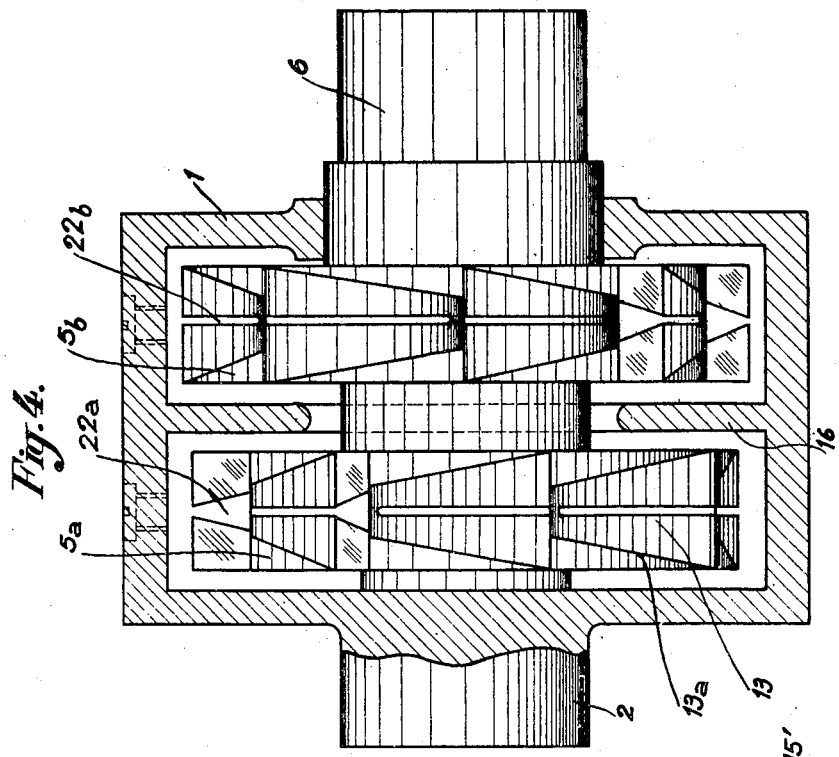
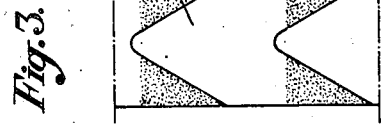
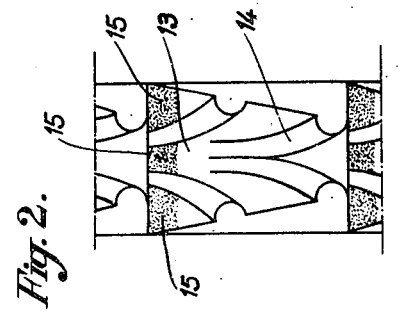
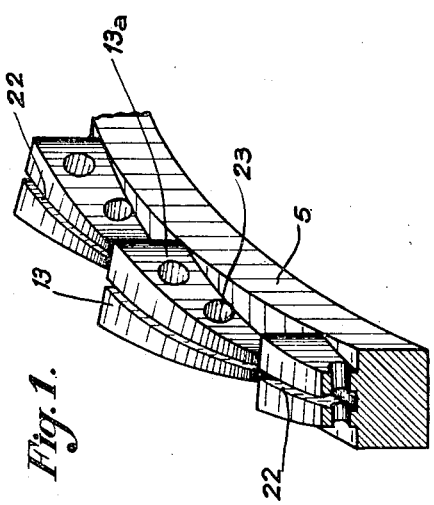
Ferdinand Badin
By Fraser, Myers & Manley
Att'ys.

United States Patent Office 2,771,170
Patented Nov. 20, 1956

2,771,170

CENTRIFUGAL POWDER CLUTCHES

Ferdinand Badin, Paris, France

Application March 28, 1951, Serial No. 217,927

Claims priority, application France July 5, 1950

4 Claims. (Cl. 192—58)

The present invention has for its object centrifugal clutches operating by means of a granular or powdery material, hereinafter called "powder," which constitutes the connecting and torque transmitting element between the driving shaft or member and the driven one. This powder can consist of inorganic materials such as metals, or organic materials whether vegetable or synthetic.

It is known that clutches of this type are designed to ensure progressive coupling between two shafts, the clutch completely sliding at the start and the sliding gradually decreasing until it disappears, at normal speed.

In the various known powder clutches with two components, one of them being hollow and containing the other, the drive of one of the components by the other mainly results from the friction of these two components on a mass of powder inserted therebetween and held in position at the periphery by centrifugal force. In some cases friction is increased by different means or by dynamic circulation of the powder. Every known device has the disadvantage in that they either lack power under reasonable dimensions or they jam when operating so that the driven machine remains coupled when at rest. In the latter case, the power transmitted can be very high but the clutch operates neither steadily nor progressively.

In the powder clutch according to the invention, the driving or driven surfaces are so shaped as to chock up or wedge the powder, as a result of the relative motion of said surfaces, at predetermined places separated by intervals wherein the powder is not chocked up, or jammed, thus increasing automatic uncoupling of the clutch when stopped. For this purpose, according to the invention, the driving component and the driven one have oppositely located surfaces which limit at least one annular space containing powder, the surface of at least one of these components bearing distorted portions, which are preferably regularly distributed, at least one side of each of said portions forming an incline, so that the gap between these two components progressively decreases, on a level with or in the region of each of these distorted portions, at least in one direction of rotation, and then increases.

The annular space is most often included between the inner surface of a hollow part, hereinafter called "casing," and the peripheral surface of a part coaxial to the former one and hereinafter called "rotor," either of these parts can be the driving component the other one being the driven component. However it is possible to design such annular spaces as substantially plane and included between two disks one of which is the driving component and the other the driven one.

As a rule, it is sufficient for either of the two parts of the clutch to bear the above-mentioned distorted portions, the other remaining cylindrical or plane as the case may be. When the annular space containing powder is cylindrical, the distorted portions are preferably carried by the rotor, the casing being cylindrical; thus is avoided the gathering, due to centrifugal force, in the would-be recesses of the casing, of powder whose mass would then be inactive.

When the driving part is rotated, the powder set in motion through contact gets distributed at the periphery of the annular space and is kept in this position by the centrifugal force. The inclines of the distorted portions give rise to the sliding of the powder layers and to the packing thereof in the narrow gaps. Thus chocking up is achieved in each narrow gap, of a powder heap which behaves as a solid mass substantially in the shape of a wedge and which secures the driving part to the driven one. However this wedging up is limited, since the gap between the two parts, on a level with a distorted portion, widens out after crossing a minimum value; there is therefore no danger of jamming the clutch owing to binding or sticking of the particles in a narrow funnel, between the two opposite parts, and furthermore this clutch acts as a torque limiting device, which is an important feature.

In certain forms of the invention wherein the power heaps are wedge-shaped, when the driving part slows down relatively to the driven one, the unchocking of the powder heaps is automatically achieved and as a consequence, this clutch is further able to free-wheel.

It is possible to give the distorted portions an asymmetrical shape, in other words a shape such that the gap between the driving part and the driven one, on a level with a distorted portion, gradually decreases in the direction of rotation and then suddenly increases.

In such a case, the distorted portions assume a shape similar to that of the teeth of a ratchet-wheel and the clutch only operates in a single direction of rotation.

It is also possible to give these distorted portions a symmetrical shape so that the gap gradually increases on both sides of the narrowest zone. The distorted portions assume, in this case, the shape of symmetrical flattened teeth, and the clutch is capable of operating in both directions of rotation.

When the motor is stopped, the field of centrifugal forces which keeps the cohesion of the powder heaps vanishes. Thus the stability of the powder heaps located in the restricted portions only depends on the own cohesion of this powder which can be very low. At rest, these powder heaps collapse by degrees and the smaller the base surface of the powder heaps compared with their height, i. e. the width of the gap at its narrowest part, the quicker this collapse.

Hence, in order to facilitate uncoupling when at rest the surfaces opposite one another of the driving part or of the driven one (or of both) are partitioned, in the restricted gaps, by recesses, such as grooves, so as to limit the base surface of the heaps; these grooves may be directed, for instance, along planes perpendicular to the rotation axis. As these grooves do not contain compressed powder, they promote the collapse by degree of the heaps; they will be called hereinafter "decompression grooves."

In order to urge the flow of the powder towards the periphery and collection thereof in the restricted gaps of the annular space, at least one of the parts of the clutch can be provided with members for centrifugally guiding the powder, for instance grooves, blades or paddies, or else openings allowing passage from one side of the rotor to the other. In particular, these guide members can assume the shape of grooves which similarly to the decompression grooves, partition the restricted gaps.

In a convenient embodiment of the invention, the same set of grooves located in at least one of the parts of the clutch, gives rise to the periodic distortions of the peripheral surface of this part, and simultaneously acts as decompression grooves. Furthermore by giving these grooves a general radial direction, the centrifugal guiding of powder can be ensured by them. The machine of this part of the clutch is thus considerably simplified. This allows of increasing the number of grooves, i. e. of increasing the number of restricted gaps in the annular space, and as a result the number of powder heaps, thus enabling the clutch to transmit high powers with reduced overall dimensions.

In this case, the grooves preferably have a curved section and a relatively small depth. The lateral rims of these grooves constitute inclines for leading the powder towards the restricted gaps located between two consecutive grooves, whereas the edge limiting these grooves allows them of behaving as decompression grooves. These edges distinctly demarcate the base surfaces of the powder heaps which have thus a well-defined volume, this permitting to determine the power and the range of operation of the clutch.

The clutches according to the invention enhance chocking up of the powder between the two clutch parts for the transmission of power while, owing to the restricted zones wherein this powder is chocked up, automatic uncoupling, at rest, of the two parts is ensured.

Consequently, although the wedging up of powder is, for conventional clutches, a drawback which it was endeavoured to avoid, on the contrary in the clutches of the invention, this wedging up which is discerningly limited, is preferable and used with interest.

Other objects and advantages of the invention will be apparent during the course of the following description.

In the accompanying drawing forming a part of this application and in which like numerals are employed to designate like parts throughout the same, Fig. 1 is a fragmentary perspective view of a clutch rotor, Figs. 2 and 3 are partial developed views of the periphery of other forms of rotor, Fig. 4 shows partly in axial section, a further form of a powder clutch capable of operating in both directions.

The clutch shown in the figures comprises a cylindrical casing 1 integral with a hollow hub 2 designed for its coupling to a shaft. A rotor, in the shape of a ratchet-wheel, is arranged inside this casing and concentrically thereto. This rotor is also fast with a hollow hub designed to be coupled to a second shaft which is to be, in normal operation, gradually secured to the former one by the wedging up of the powder.

The annular space between the casing and the rotor contains a certain amount of powder of the kind commonly used in this type of clutch, for instance powder of graphited cast-iron.

In the absence of powder, these two clutch parts can freely rotate relatively to one another owing to the insertion therebetween of a ball-bearing. The powder is prevented from leaking out of the casing by means of felt rings forming a joint between the two parts of the clutch.

The above-described clutch operates as follows:

Assuming the casing 1 to be fast with a motor, the powder lying inside the substantially cylindrical annular space between this casing and the rotor 5a and 5b, is progressively rotated. Being urged by friction of the surfaces in contact with the powder, it tends to get distributed at the periphery of this space, as a layer of uniform thickness. Each of the inclines 13 formed by the slanting sides of the teeth of the rotor, causes then the sliding of the powder layer, from the central zone between the teeth towards the restricted gaps corresponding to the top of these teeth. Powder, thus gradually piles up into heaps chocked up in the vicinity of the top of the slanting sides of each tooth. There is hence a moment when heaps of powder are strongly packed in the restricted gaps, between these teeth and the wall of the casing. However this packing has a limited effect since the gap between the casing and the rotor widens out beyond the top of each tooth.

At normal rate, small pillars of packed powder are thus formed at the top of each tooth, and ensure the driving of the rotor by the torque supplied by the casing.

If the casing slows down, these heaps of powder are automatically unchocked and the rotor goes on freewheeling. At rest, as the centrifugal force no longer heaps the powder at the periphery of the casing, these heaps of powder collapse and the two parts of the clutch are uncoupled. In order to promote this collapse, the rotor is provided with a central groove 22a and 22b whose bottom is conveniently wider than its opening, so that, during operation, powder cannot be packed therein. The base surface of each heap of powder is reduced owing to this groove and powder can flow thereinto when coupling is at rest.

It is to be noted that, whether the rotor constitutes the driving part or the driven one, the clutch operates just as well.

The chocking up phenomenon achieved in the cylindrical space containing the powder, may conveniently be completed by a similar phenomenon on the lateral walls delimiting this space. In this case, as shown in Fig. 1, each tooth 13 can have oblique lateral faces 13a also forming inclines and acting similarly to the incline 11 as described hereinabove. Furthermore, the rotor can be provided with openings 23 which ensure proper distribution of the powder by allowing passage thereof from one side of this rotor to the other. Lastly, in order to further the chocking up of the powder heaps, the walls opposite one another of the caisng and of the rotor can be roughened by any convenient process, in particular by the Schoop process.

In order to achieve an adequate distribution of powder at the periphery of the casing, the lateral faces of this casing or those of the rotor can be provided with powder guiding members which regulate the centrifugal spreading while distributing this powder at the periphery.

Among the means for urging the flow towards the periphery of the casing, it may be resorted to grooves 14 (see Fig. 2) provided on the side of the teeth and designed to guide the powder towards the top of each tooth.

Similarly to the grooves 22, these grooves have the additional advantage to partition the incline formed by the side of each tooth, into small surfaces on each of which a small heap of powder piles up. Thus, in Fig. 2, instead of a single heap on the whole surface of the tooth, three small heaps are obtained whose bases 15 are indicated by dotted surfaces. The base surface of these heaps is small relatively to their height which is equal to the narrowest distance between the rotor and the casing, so that, when the machine stops, they easily collapse.

The same result can be achieved, as shown in Fig. 3, by using teeth 13 whose top is in the shape of a broken line. In this case, the heaps are formed on the protruding portions of teeth and have for bases the triangles 15'.

As shown in Fig. 4, it is possible to fit up on a same hub 6, two rotors 5a and 5b in the shape of ratchet-wheels having oppositely inclined teeth each provided with decompression grooves 22a and 22b. It is thus possible to rotate the casing 1 indifferently in one direction or in the other, according to the direction of rotation of the driving hub 6, or inversely, if the casing 1 is the driving element, to drive indifferently in either direction, the hub 6.

In case the teeth of the rotors 5a and 5b do not comprise inclines on their lateral sides, the casing 1 need not be partitioned. On the other hand if the teeth have lateral inclines, as shown in the figure, it is convenient to provide a partition wall 16 inside the casing in order to make up for the axial thrusts caused by these lateral inclines.

The powder having been directed, along the inclines formed by the walls of the grooves, towards the restricted gaps, the amount of powder remaining inside these grooves is relatively small. Moreover the free space in the latter being relatively large, the amount of powder which remains therein is practically not compressed. When the heaps of powder are strongly chocked up, the two parts of the clutch are secured to one another and power is transmitted from one to the other. It is to be noted that since the number of peripheral protrusions is great, this power may be important, even in the case of a clutch of quite small overall dimensions.

When motion is stopped, the rims of the heaps of powder limited by the edges separating the grooves from the protrusions collapse and, provided the length of the base surface of these heaps measured along the periphery of the rotor is not too great relatively to the height of the heaps, they completely collapse and the two parts of the clutch are loosened from one another. The size of the clutch and that of the grooves are determined so as to obtain the maximum power consistent with the possibility for the clutch to exhaust the heat generated whilst slipping at the start.

What I claim is:

1. A centrifugal powder clutch comprising a hollow casing member and a rotor member within said casing and coaxial therewith, the casing having an inner peripheral wall shaped as a surface of revolution, the rotor having in the peripheral zone thereof a plurality of circumferentially spaced protruding portions lying in a surface of revolution coaxial with and spaced from the inner peripheral wall of the casing, each of the peripheral portions having a peripheral side inclined with a component toward the hub of the rotor member, and a powder-guiding peripherally directed groove in each of the said peripheral sides.

2. A clutch according to claim 1 in which the peripherally directed groove is of arcuate cross-section.

3. A clutch according to claim 1 in which the peripherally directed groove is widest at its base portion.

4. A clutch according to claim 1 in which the protruding portion has at least two peripherally-directed grooves converging toward each other but not meeting so as to divide the peripheral side into at least three equal parts.

References Cited in the file of this patent

UNITED STATES PATENTS

| | | |
|---|---|---|
| 2,654,454 | Turkish | Oct. 6, 1953 |

FOREIGN PATENTS

| | | |
|---|---|---|
| 678,016 | France | Mar. 18, 1930 |
| 797,993 | France | Nov. 19, 1935 |
| 920,562 | France | Apr. 11, 1947 |
| 385,894 | Great Britain | Jan. 5, 1933 |
| 78,477 | Sweden | Apr. 17, 1931 |